(12) United States Patent
Bissen et al.

(10) Patent No.: US 7,055,613 B1
(45) Date of Patent: Jun. 6, 2006

(54) SELF LEVELING BOOM SYSTEM WITH ROTATABLE WORKING ASSEMBLY

(75) Inventors: David R. Bissen, Plymouth, MN (US); Jason D. LaPlante, Lino Lakes, MN (US); Stephen J. Catflisch, Lindstrom, MN (US)

(73) Assignee: Schwing America, Inc., White Bear Lake, MN (US)

( * ) Notice: Subject to any disclaimer, the term of this patent is extended or adjusted under 35 U.S.C. 154(b) by 170 days.

(21) Appl. No.: 10/798,589

(22) Filed: Mar. 11, 2004

Related U.S. Application Data

(60) Provisional application No. 60/454,153, filed on Mar. 12, 2003.

(51) Int. Cl.
*A62C 27/00* (2006.01)
*A62C 25/00* (2006.01)
*A62C 13/62* (2006.01)

(52) U.S. Cl. ............................ 169/24; 169/52; 169/66; 169/67; 169/68; 239/271; 239/272

(58) Field of Classification Search ................. 169/24, 169/52, 66, 67, 68, 70; 239/271, 272
See application file for complete search history.

(56) References Cited

U.S. PATENT DOCUMENTS

| | | | |
|---|---|---|---|
| 5,211,245 A | 5/1993 | Relyea et al. | |
| 5,301,756 A | 4/1994 | Relyea et al. | |
| 5,651,417 A * | 7/1997 | Coughlin | 169/51 |
| 5,839,664 A | 11/1998 | Relyea et al. | |
| 6,340,060 B1 * | 1/2002 | Larsson et al. | 169/43 |
| 6,755,259 B1 * | 6/2004 | Peltola et al. | 169/47 |

* cited by examiner

*Primary Examiner*—Davis Hwu
(74) *Attorney, Agent, or Firm*—Kinney & Lange, P.A.

(57) ABSTRACT

A fire fighting vehicle having a boom system includes a working assembly attached to an end portion of the boom system. The working assembly comprises a frame pivotally mounted at a midpoint of the frame to the end portion of the boom. The frame carries a mechanical actuator that is connected to a tool capable of piercing an exterior of a structure when the mechanical actuator is actuated.

17 Claims, 14 Drawing Sheets

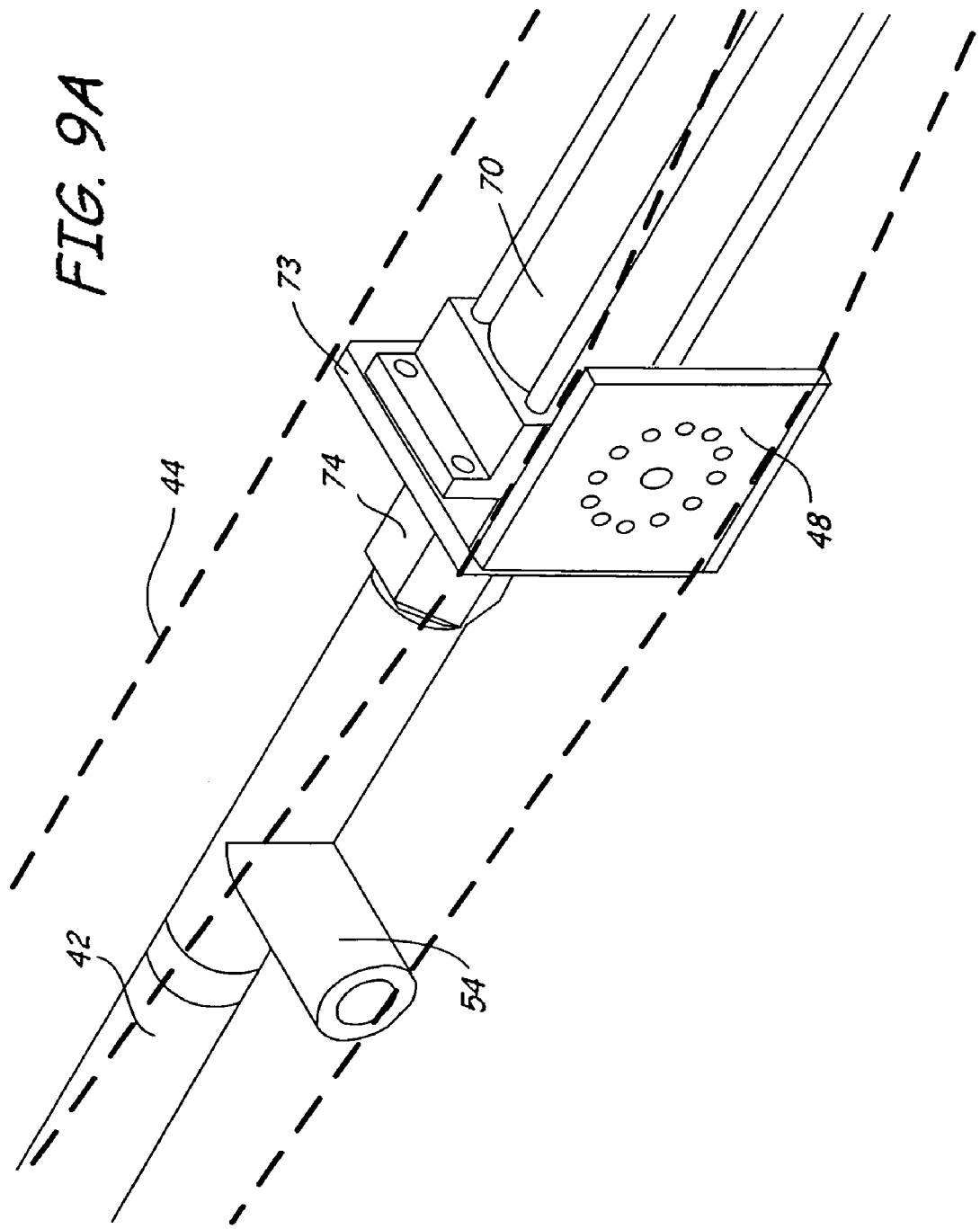

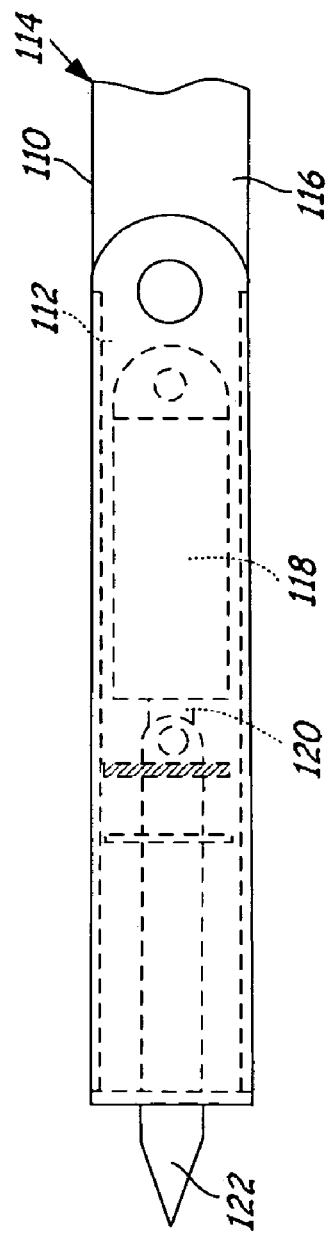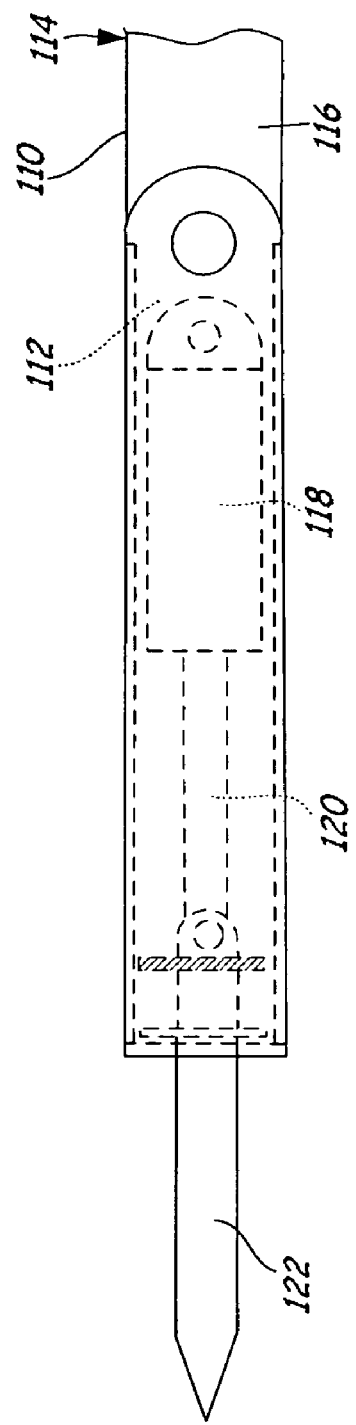
FIG. 11A
FIG. 11B

SELF LEVELING BOOM SYSTEM WITH ROTATABLE WORKING ASSEMBLY

CROSS-REFERENCE TO RELATED APPLICATION(S)

This application claims the benefit of Provisional Application No. 60/454,153 filed Mar. 12, 2003 for "SELF LEVELING BOOM SYSTEM WITH ROTATABLE WORKING ASSEMBLY".

BACKGROUND OF THE INVENTION

The present invention pertains to a working assembly for fire fighting vehicles with aerial boom systems that carry and position a fluid delivery line. Generally, such fire fighting vehicles include a lower boom section and an upper boom section pivotally connected to the lower boom section. The aerial boom system can be actuated to position a fluid nozzle at the end of the upper boom section relative to the exterior of a burning structure to discharge a fire fighting fluid. In those circumstances when an interior of a structure is burning, there may be a need to create an opening through the exterior of the structure to discharge a fire fighting fluid into the interior of the burning structure. There is a need for a fire fighting vehicle that carries a working assembly on the aerial boom system that can be actuated to pierce an exterior surface of a structure to permit a fire fighting fluid to be discharged into the interior of a burning structure.

BRIEF SUMMARY OF THE INVENTION

A fire fighting vehicle with a boom system comprises a working assembly attached to the boom system. The working assembly comprises a frame mounted to an end portion of the boom system. A mechanical actuator is mounted to the frame and is connected to a tool that is configured to pierce an exterior of a structure via movement of the mechanical actuator.

BRIEF DESCRIPTION OF THE DRAWINGS

FIGS. 9A–9B are enlarged partial perspective views of the hydraulic cylinder-to-lance connection of the work assembly of the present invention.

FIGS. 11A–11B are schematic views of an alternative embodiment of a working assembly of the present invention.

DETAILED DESCRIPTION

Figure 1:
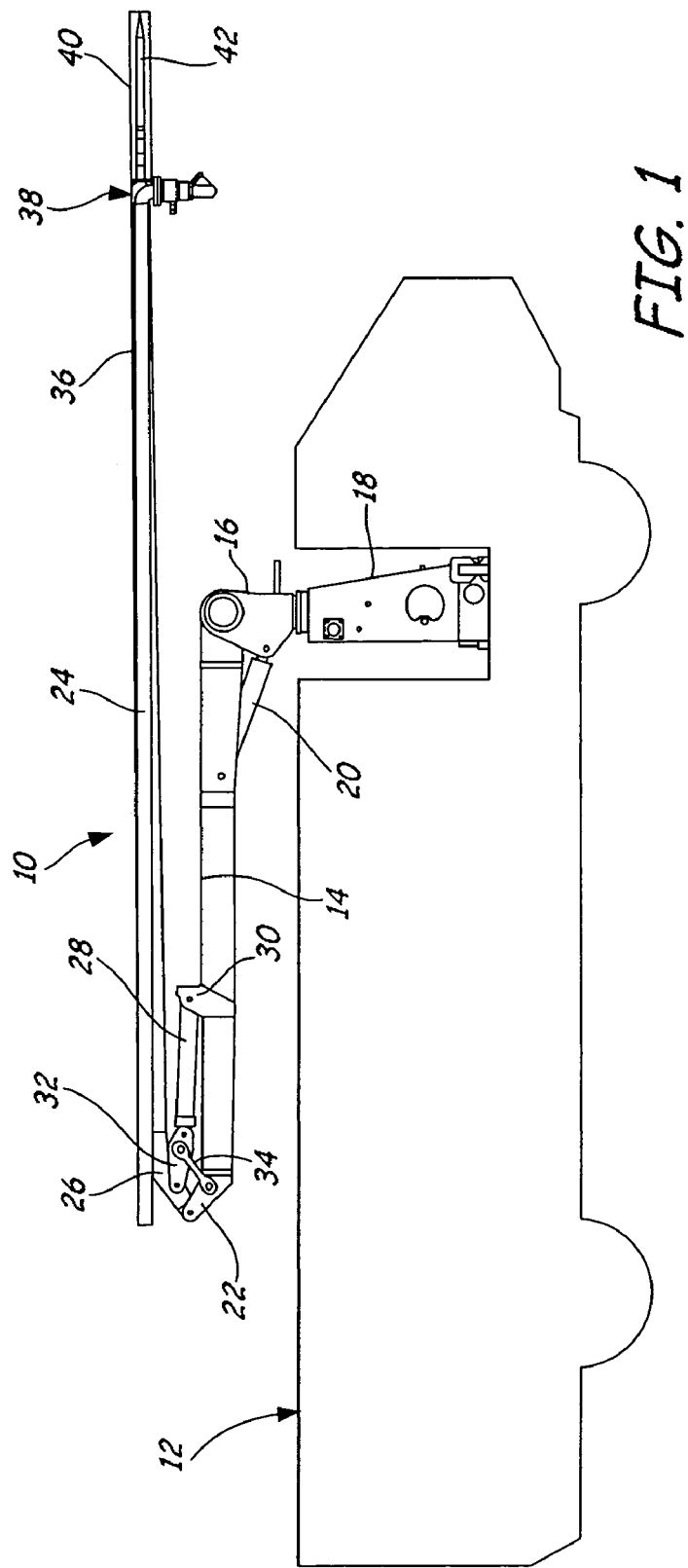
FIG. 1 is a side view of the boom system of the present invention with the boom in a folded, stored position.

As generally shown in FIG. 1, the present invention comprises a two-section boom system 10 for mounting on, for example, a fire fighting vehicle 12. A lower boom section 14 pivotally attaches to a turret column 16 that is supported by a main supporting tower 18 mounted to the vehicle 12. In one embodiment, lower boom section 14 extends rearward relative to the vehicle when it is in the folded position demonstrated in FIG. 1. A rotational connection of turret column 16 to supporting tower 18 provides for horizontal rotary motion of boom system 10. A hydraulic cylinder 20 is connected between the turret column 16 and the lower boom section 14 for elevating the lower boom section from a horizontal position, as shown in FIG. 1, to the various elevated positions, as shown in FIGS. 2–6. The boom system 10 of the present invention can be mounted on any other mobile or stationary platform used to fight fires in other situations.

Pivotally connected to end 22 of the lower boom section 14 is an upper boom section 24. End 26 of upper boom section 24 and end 22 of lower boom section 14 are formed at an angle relative to the respective boom sections to provide a degree of separation between lower boom section 14 and upper boom section 24 when boom system 10 is in the folded, stored position shown in FIG. 1. Upper boom section 24 extends in a forward direction relative to the vehicle when it is in the stored position. A hydraulic cylinder is connected between a mounting support 30 on the lower boom section 14 and end 26 of upper boom section 24. In one embodiment, the arm of hydraulic cylinder 28 is directly connected to end 26 of upper boom section 24. In an alternative embodiment, shown in FIGS. 1–6, hydraulic cylinder 28 is connected to upper boom section 24 via linkage member 32, with a lever arm 34 connected between linkage member 32 and end 22 of lower boom section 14.

Figure 2:
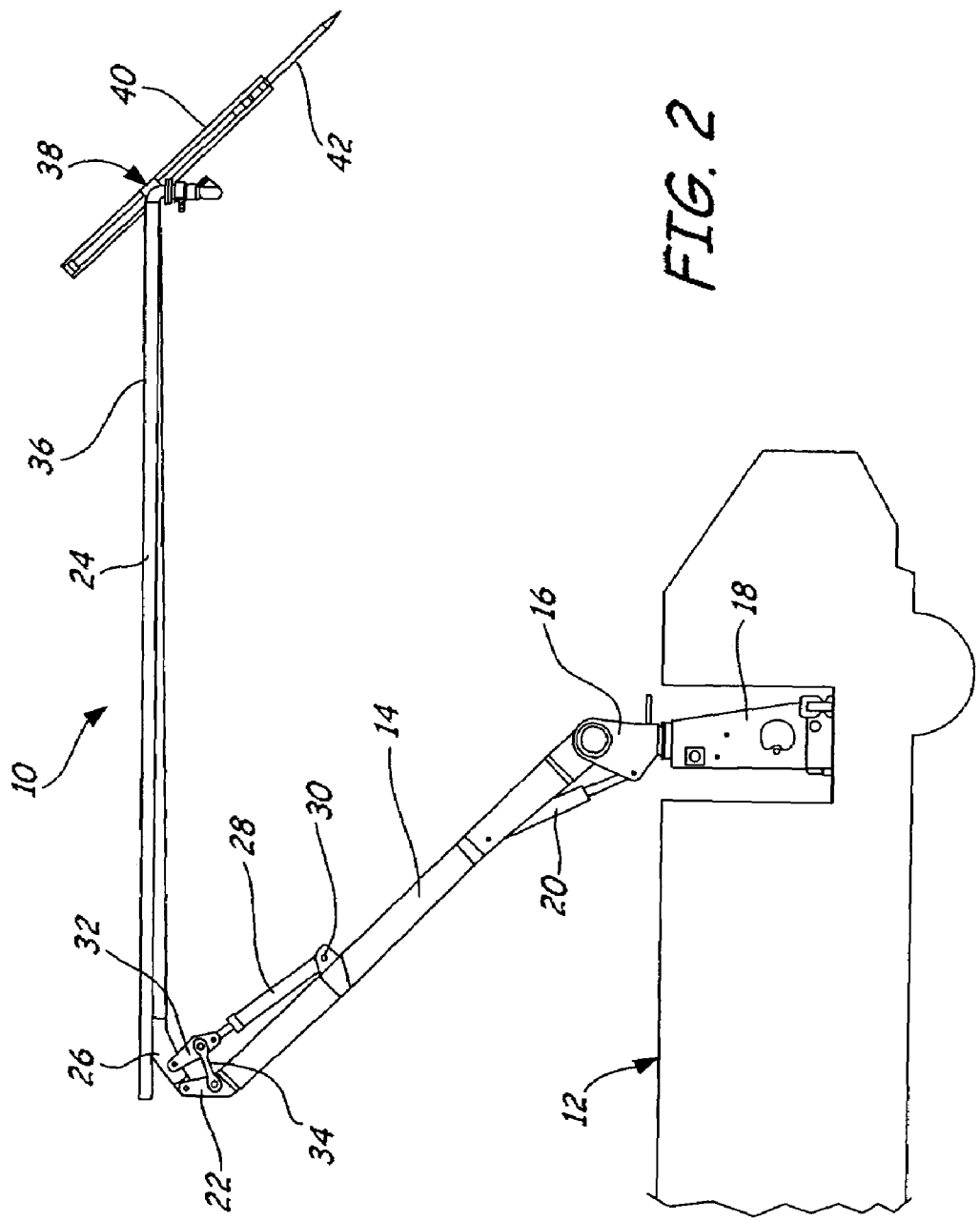
FIG. 2 is a side view of the boom system of FIG. 1 with the boom in a first unfolded position.
Figure 3:
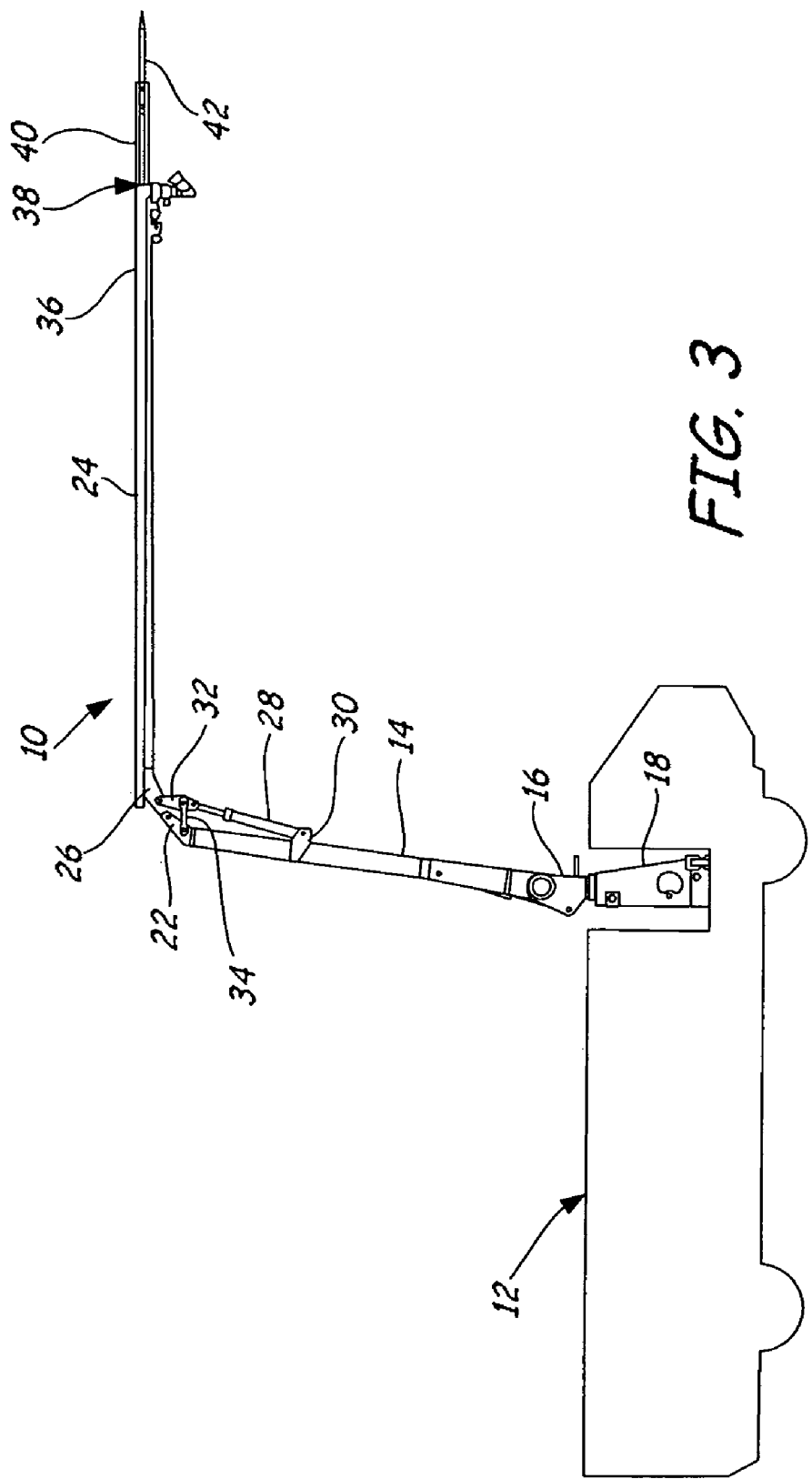
FIG. 3 is a side view of the boom system of FIG. 1 with the boom in a second unfolded position.

Boom system 10 is provided with a control system for coordinating the operation of hydraulic cylinders 20 and 28. In one embodiment, the upper boom section 24 is provided with a sensor shown generally at 36 that detects the position of the upper boom section 24 as lower boom section 14 is elevated by hydraulic cylinder 20. A signal indicative of position of upper boom section 24 is sent to the control system. As shown in FIGS. 2–3, the control system controls the hydraulic flow delivered to hydraulic cylinder 28 to ensure that the upper boom section 24 remains level as hydraulic cylinder 20 extends and elevates lower boom section 14. In one embodiment, sensor 36 is an Autolevel Sensor #M425-42-6V made by P-Q Controls, Inc. of Bristol, Conn. As further demonstrated in FIGS. 4–6, provision is made to manually disable sensor 36 to allow upper boom section 24 to be manually positioned at various angles relative to lower boom section 14.

The articulated arm design of boom system 10 may be dimensioned with a vertical reach of about 55 feet and a horizontal reach of about 31 feet, depending on vehicle height. The articulation of boom system 10 and the horizontal rotation of the turret column can be restricted by geometry, mechanical stops, or by electronic control systems to ensure stability of a mobile vehicle during use of the boom, without the need for stabilizing outriggers. Boom system 10 can carry one or more conduits to deliver fluids to the end 38 of the upper boom section 24, in a manner readily known in the art.

Rotatably mounted at end 38 of the upper boom section 24 is a working assembly 40. Working assembly 40 may be equipped with a variety of tools that may be used in junction with the delivery of fluids via the conduits. In one preferred embodiment, the working assembly comprises a hydraulically actuated fluid delivery lance 42, which can be used to pierce the wall of a vessel, hull, or building, etc., for the purpose of dispensing fire-fighting fluids inside those structures.

Figure 7:
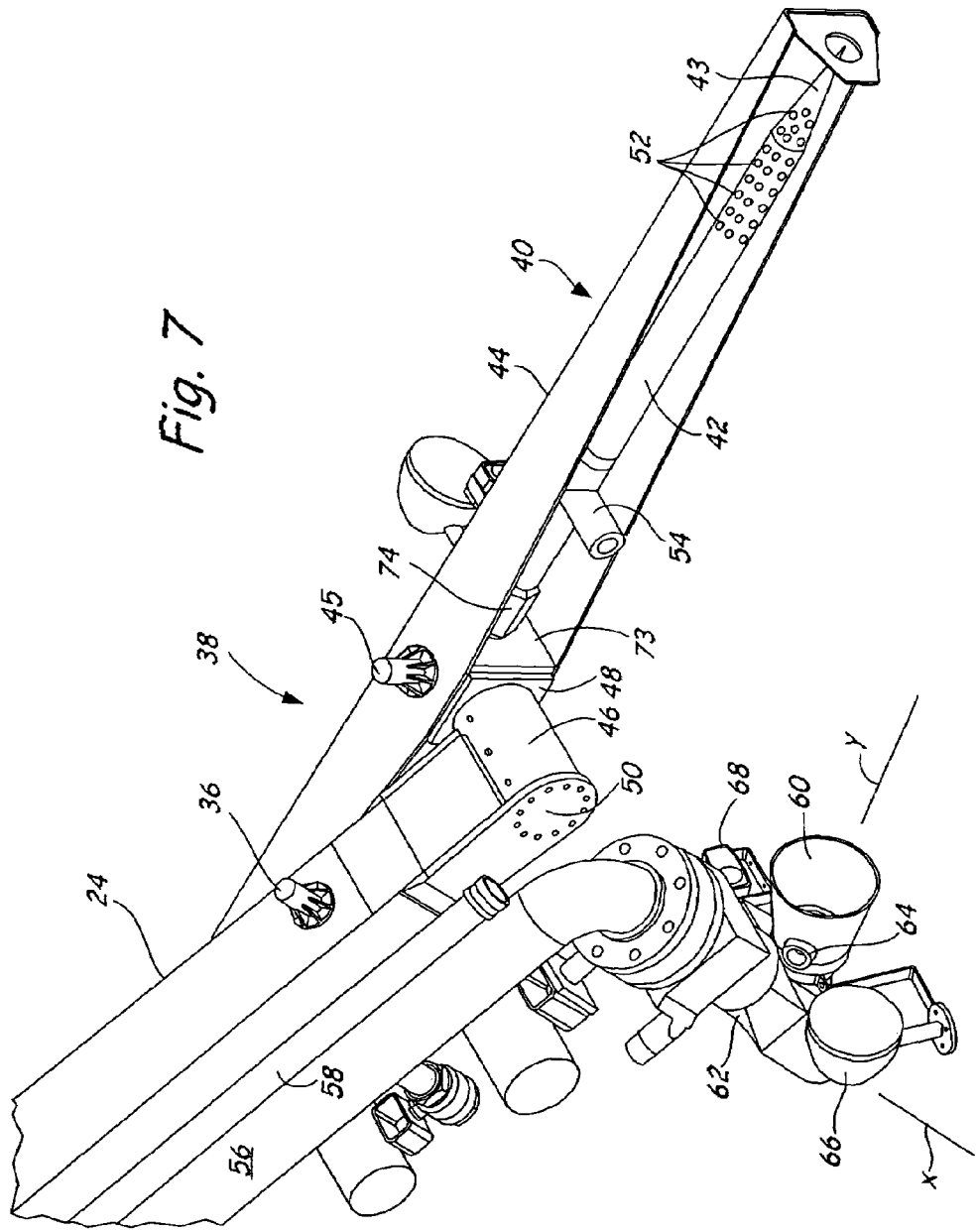
FIG. 7 is a first enlarged perspective view of a working assembly of the boom system of FIG. 1.

End 38 of upper boom section 24 and working assembly 40 is shown in greater detail in FIG. 7. As shown in FIG. 7, working assembly 40 comprises an elongated frame 44. Frame 44 is mounted to end 38 of upper boom section 24 via a rotary actuator 46. In one embodiment, rotary actuator 46 is a helical hydraulic rotary actuator #L10-5.5 made by Helac Corporation of Enumclaw, Washington.

Rotary actuator 46 is mounted between a mounting plate 48 secured to frame 44 and a mounting flange 50 attached to end 38 of upper boom section 24. Rotary actuator 46 can provide up to a 360 degree range of motion of working assembly 40.

Figure 4:
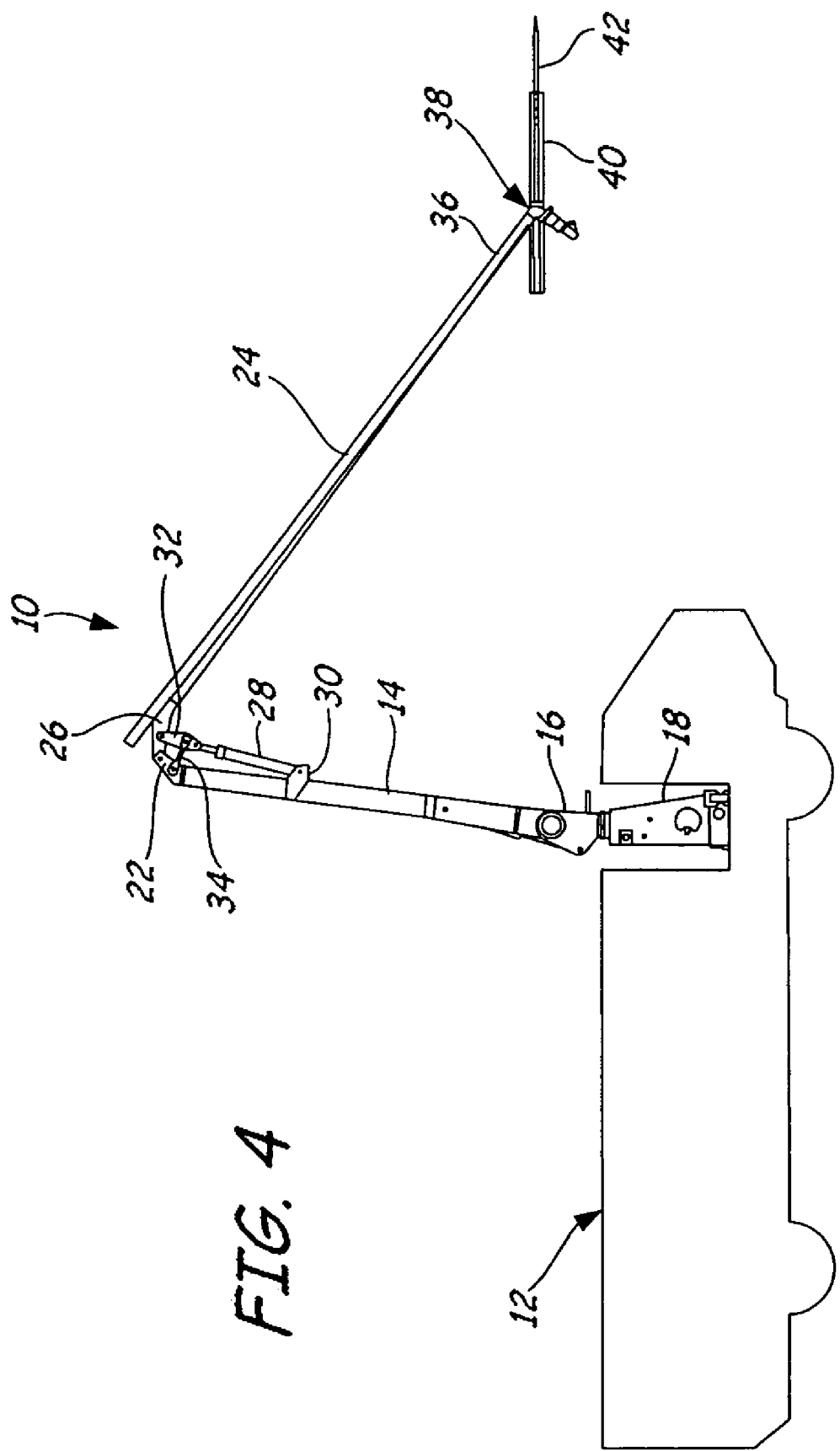
FIG. 4 is a side view of the boom system of FIG. 1 with the boom in third unfolded position.
Figure 5:
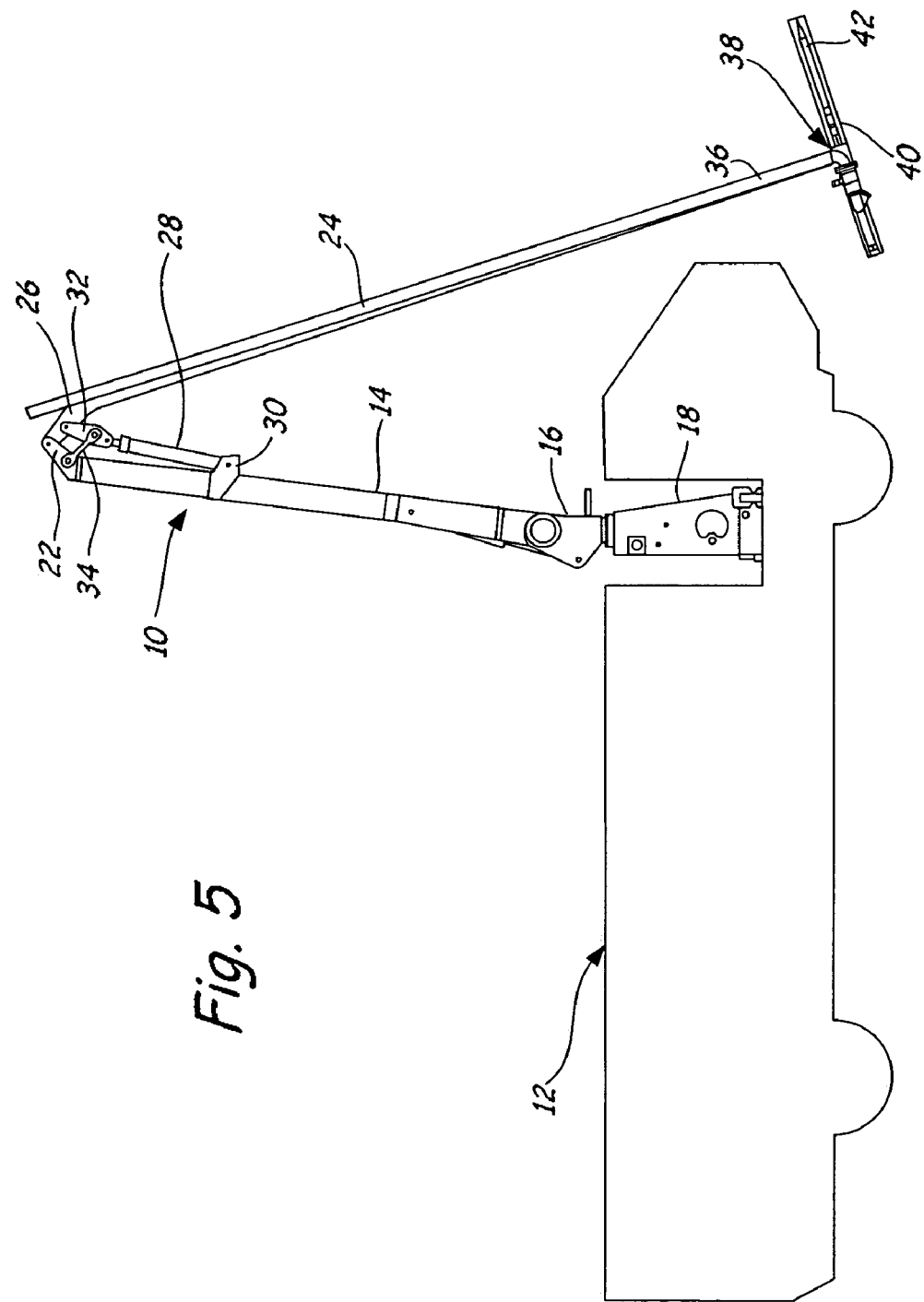
FIG. 5 is a side view of the boom system of FIG. 1 with the boom in fourth unfolded position.
Figure 6:
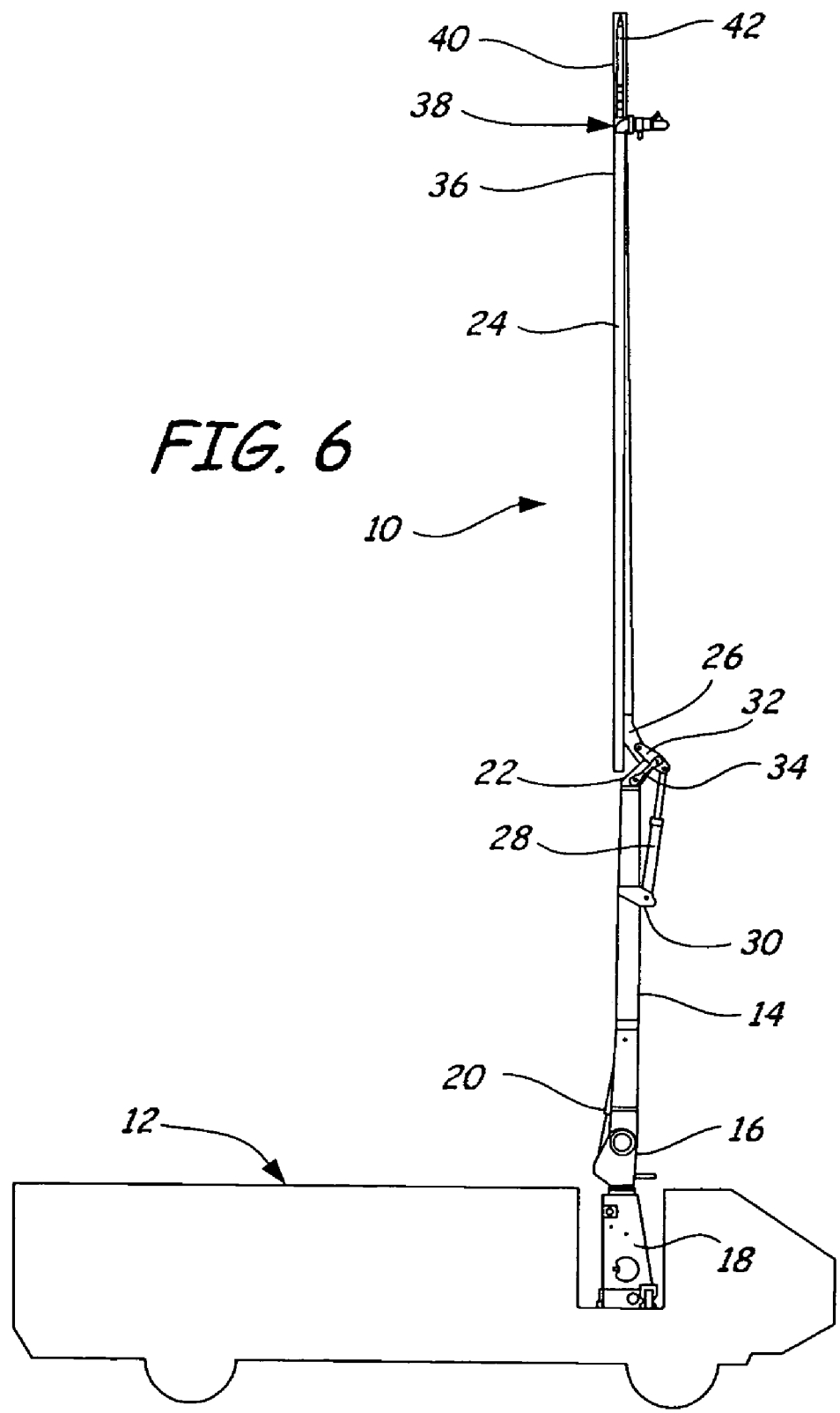
FIG. 6 is a side view of the boom system of FIG. 1 with the boom in fifth unfolded position.

Frame 44 may also be equipped with a sensor 45, which like sensor 36 on upper boom section 24 senses the position of working assembly 40 and sends a signal to the control system. The control system controls the rotary actuator 46 to maintain working assembly in a level position (as shown in FIGS. 3–4). As further demonstrated in FIGS. 2 and 5, provision is made to manually disable sensor 45 to allow the working assembly 40 to be manually positioned at various angles relative to upper boom section 24.

Carried by frame 44 of working assembly 40 is a hollow lance 42 with a piercing tip 43. Hollow lance 42 is provided with multiple circumferentially distributed holes 52 that can extend from the tip along the length of lance 42 for the delivery of fluid via lance 42. In one embodiment, lance 42 is of a variety of piercing nozzles made by FlameFighter Corporation of Waconia, Minn. Lance 42 is connected to a hollow branch connection 54, which enables a flame fighting fluid to be delivered to lance 42 via a fluid-carrying line (not shown) that is connected to one or more of the fluid delivery conduits, such as conduits 56 and 58 carried by boom system 10. Conduits 56 and 58 are designed to carry water and foam, respectively, to a spray nozzle 60 that is mounted on a hydraulically actuated monitor 62. Monitor 62 can be capable of continuous rotation about axis X and a pivoting movement in a plane defined by axis Y, which is perpendicular to axis X. Flow direction of the flame fighting fluid is controlled through the use of a primary remote-actuated valve that controls flow to the spray nozzle 60, and a secondary remote-actuated valve that controls flow to the hollow lance 42. The flow of the flame fighting fluid can be directed by these valves such that either or both can be dispensing fluid at any time.

Nozzle 60 is remotely adjusted and includes chemical feed inlet 64. In one embodiment, a chemical line is connected to the nozzle 60 and extends to the base of the boom system 10 for connection to chemical supply system. Also, as part of this nozzle assembly, a light 66 and a remote camera 68 may be fixed to the vertical articulation of nozzle 60, for the purpose of illuminating and viewing in the direction of the flow nozzle.

Figure 8:
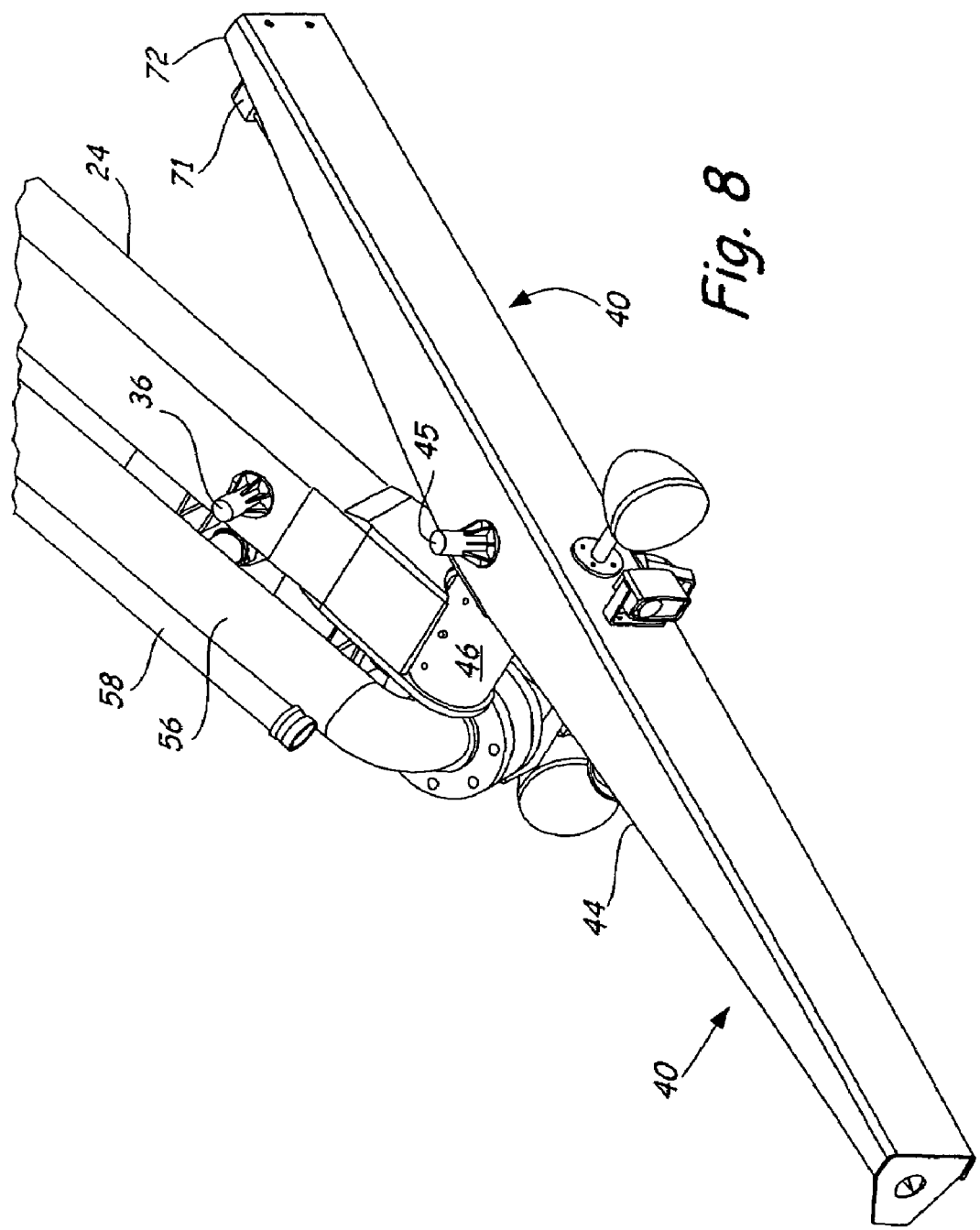
FIG. 8 is a second enlarged perspective view of the working assembly of FIG. 7.
Figure 9:
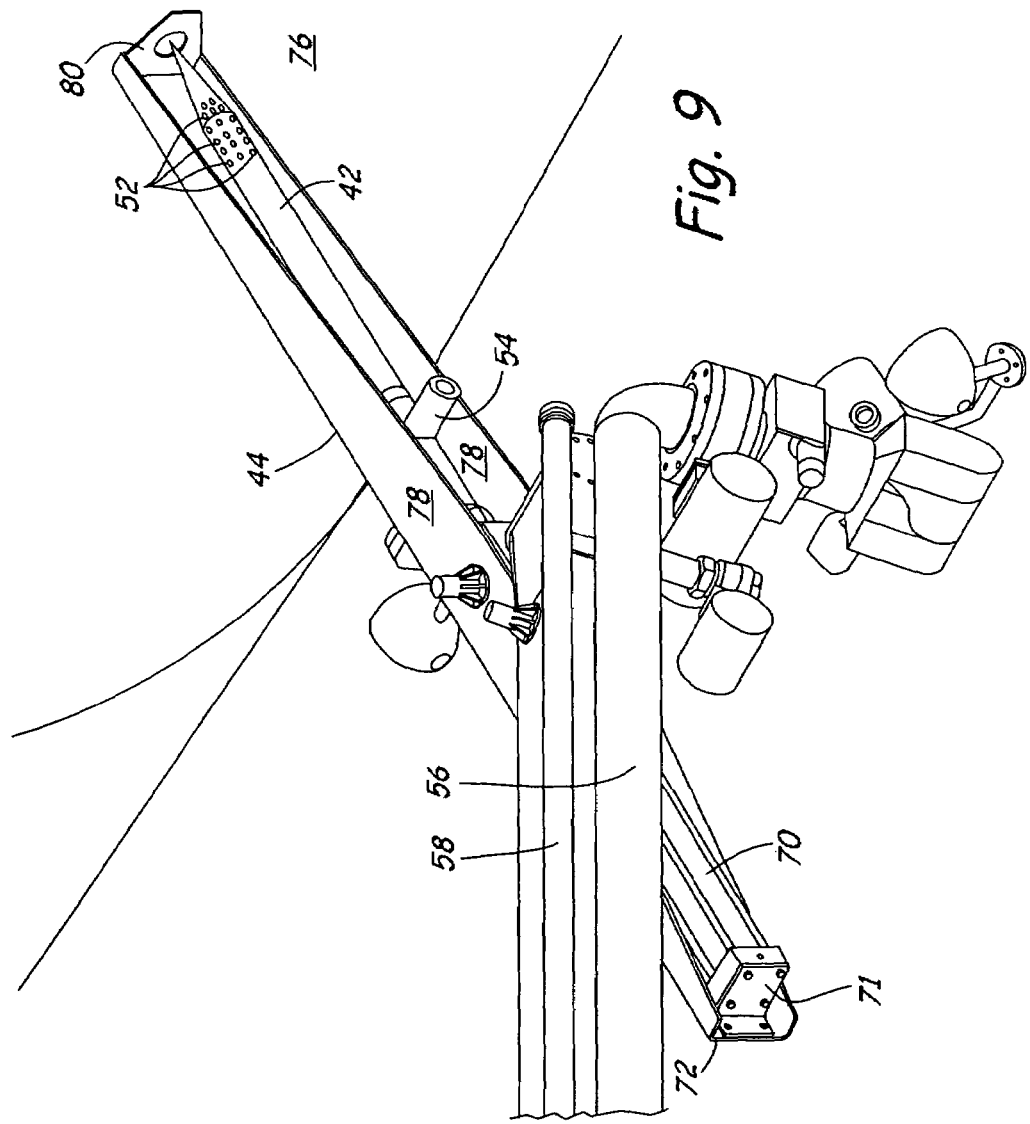
FIG. 9 is an enlarged perspective view of the working assembly of FIGS. 7–8 positioned next to the surface of a structure.
Figure 9B:
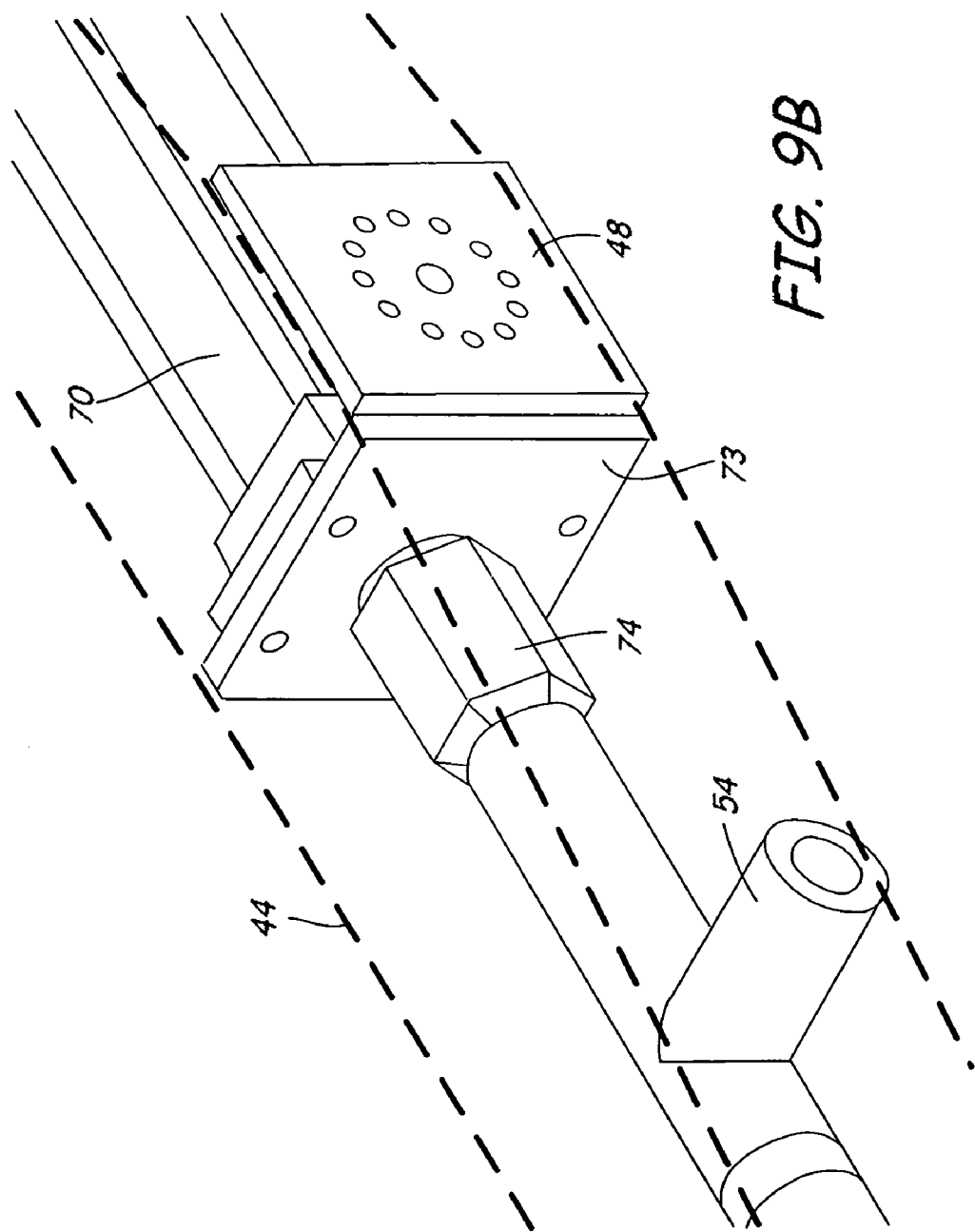
Figure 10:
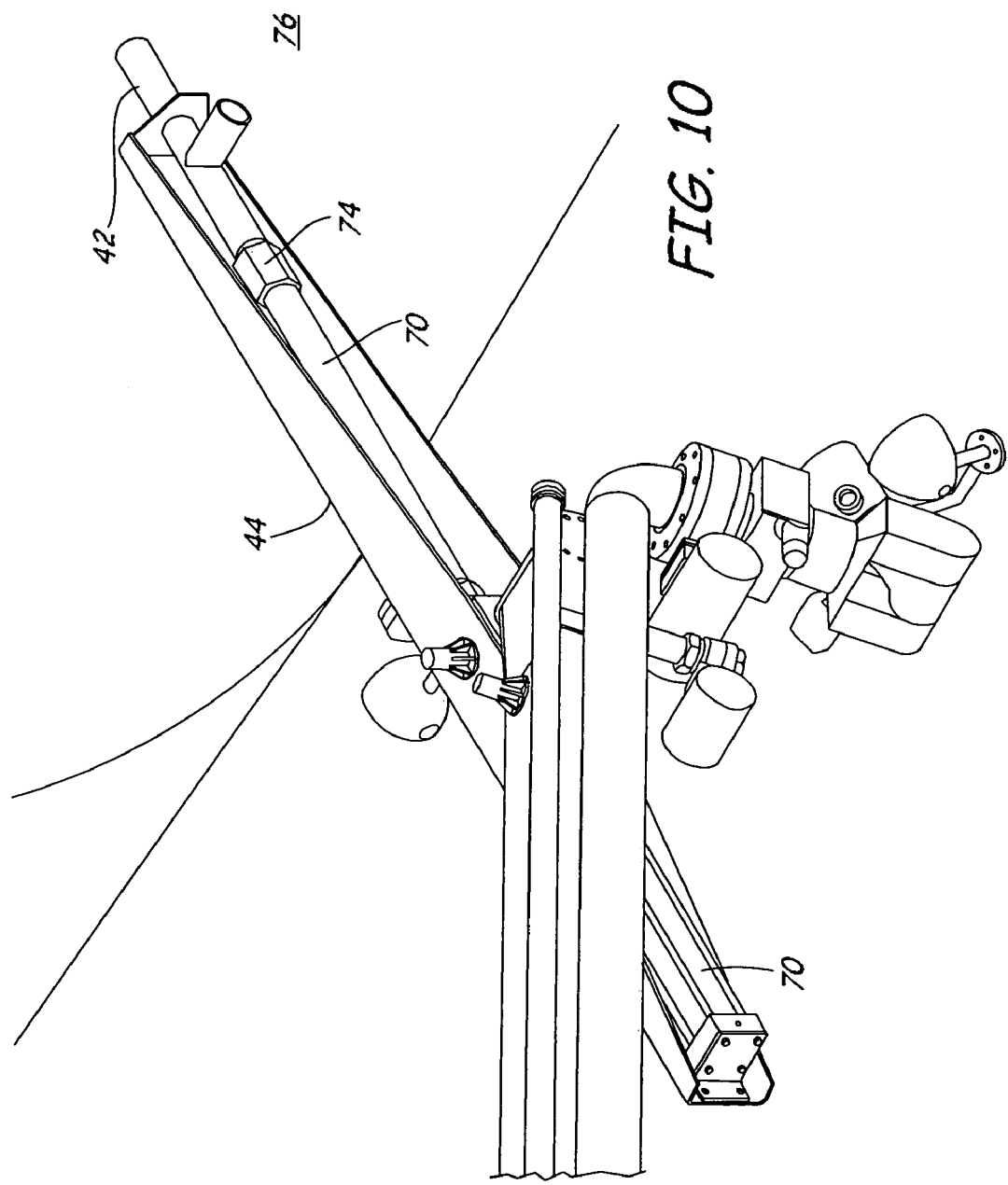
FIG. 10 is an enlarged perspective view of the working assembly of FIG. 9 with a lance of the working assembly piercing through the surface of the structure.

As shown in FIGS. 8–9, a hydraulic cylinder 70 is connected at one end to a mounting flange 71 located at end 72 of frame 44, and at the other end to a plate 73 secured to frame 44 (shown in FIG. 7). Further detail is also shown in FIGS. 9A–B. The piston rod of hydraulic cylinder 70 passes through a hole in plate 73 and in one embodiment is connected to the branch connection 54 connected to lance 42. Branch connection 54 may be connected to the piston rod of hydraulic cylinder 70 by a threaded connector 74, or by welding. In operation, as shown in FIG. 9, the vehicle carrying boom system 10 and working assembly 40 is positioned relative to a burning structure, such as the fuselage of an airplane. The boom system 10 is then adjusted to position the tip of lance 42 against the outer surface 76 of the structure. As shown in FIG. 10, hydraulic cylinder 70 is then actuated to thrust the piercing tip of lance 42 through the surface and into the interior of the structure.

In one embodiment, lance 42 may have a length of 3 feet or greater to ensure that a sufficient length of lance 42 extends well into the interior of the structure to provide a dispersion of fluid via holes 52. A provision is shown for including guard 78 and guide 80 assemblies to protect the actuating hydraulic cylinder and hollow piercing nozzle during storage, transport, and operation. Also mounted on this assembly is a light to illuminate the end of the piercing tip. Further, provision is made for the mounting of a remote camera that will focus on the end of the piercing tip, for the purpose of remote viewing of the piercing tip.

While a working assembly 40 has been described to use a hollow fluid delivery lance, other tools may be employed, including but not limited to a chisel, hammer, drill, saw, scissors, or water jet. Also, the tools employed by working assembly 40 may be driven by means other than a hydraulic cylinder, including but not limited to a pneumatic cylinder, an inert gas-filled cylinder, a ball screw, a chain drive, a rack, a worm gear, or an electric motor. While working assembly 40 has been described as being mounted to boom system 10 of the present invention, it is to be understood that working assembly 40 may be mounted to any variety of boom configurations.

FIGS. 11A–11B are a schematic view of an alternative embodiment of a working assembly 110 of the present invention. FIGS. 11A–11B show a housing 112 pivotally attached to an end 114 of an upper boom section 116, which can be pivotally actuated by hydraulics. A hydraulic cylinder 118 is mounted within the housing 112. A piston rod 120 of the hydraulic cylinder 118 is connected to a piercing tip 122. Extension of the hydraulic cylinder 118 thrusts the piercing tip 122 through the surface of a structure, as previously described. The piercing tip has a structure previously described.

Figure 12A:
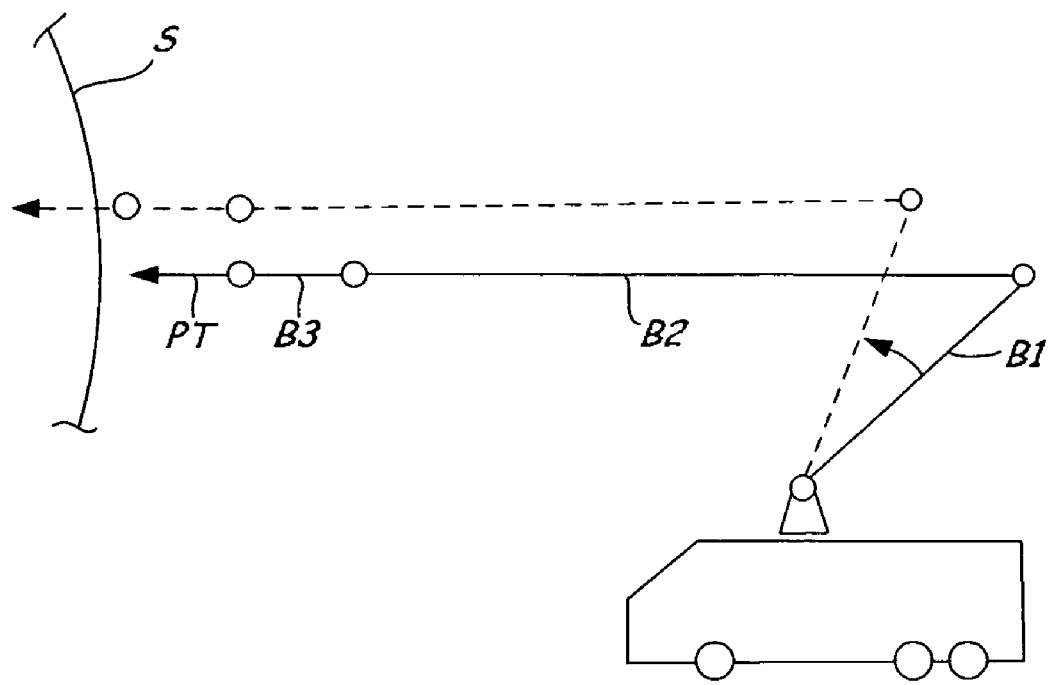
FIGS. 12A–12B are a schematic views of alternative boom systems of the present invention.
Figure 12B:
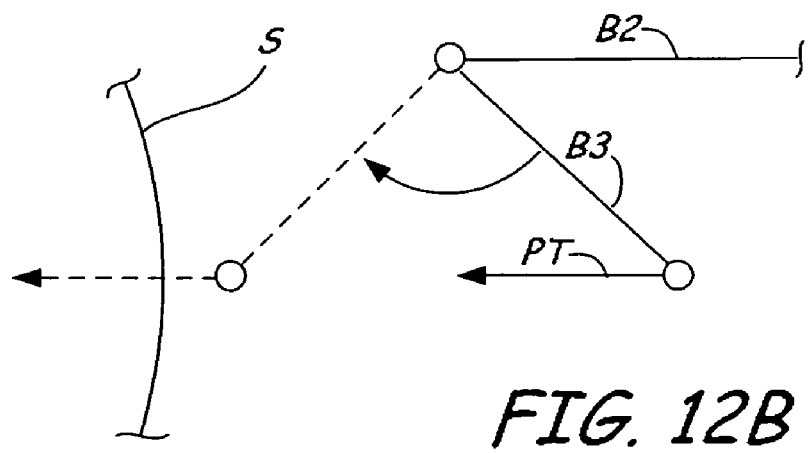

FIGS. 12A–12B demonstrate a boom system having hydraulically articulated boom sections B1, B2 and B3 that position and thrust a previously described piercing tip (PT) relative to the surface (S) of a structure. FIG. 12A shows that boom section B1 is pivoted toward surface (S) to thrust the piercing tip (PT) into the structure. FIG. 12B shows that boom section B3 is pivoted to thrust the piercing tip (PT) into the structure.

Although the present invention has been described with reference to preferred embodiments, workers skilled in the art will recognize that changes may be made in form and detail without departing from the spirit and scope of the invention.

The invention claimed is:

1. A working assembly for a fire fighting vehicle having a boom system, the working assembly comprising:
    a frame mounted to an end portion of the boom system, the frame having a first end, a second end and a midpoint between the first and second ends;

a mechanical actuator mounted to the frame wherein the mechanical actuator is a hydraulic cylinder, the hydraulic cylinder supported between the first end and the midpoint of the frame, the hydraulic cylinder having a piston rod extendable toward the second end of the frame; and a tool axially aligned with and connected to the piston rod, the tool configured to pierce an exterior of a structure via movement of the mechanical actuator.

2. The working assembly of claim 1, wherein the frame is pivotally mounted to the end portion of the boom system.

3. The working assembly of claim 2, wherein the midpoint of the frame is pivotally mounted to the end portion of the boom system.

4. The working assembly of claim 3, wherein the frame further comprises a rotary actuator secured at the midpoint of the frame.

5. The working assembly of claim 1, wherein the tool comprises a lance having a first end configured to deliver a fluid and a second end connected to the piston rod of the hydraulic cylinder.

6. The working assembly of claim 5, wherein the lance comprises a hollow body, the hollow body having a port for connection to a fluid source, the hollow body having at least one opening at the first end of the lance for delivery of fluid.

7. A working assembly for a fire fighting vehicle having a boom system, the working assembly comprising:

a frame mounted to an end portion of the boom system, the frame having a first end, a second end and a midpoint between the first and second ends;

a hydraulic cylinder having a piston rod, the hydraulic cylinder mounted to the frame near the first end of the frame, the piston rod being extendable toward the second end of the frame; and a lance configured for connection to a fluid source, the lance having a first end connected to the piston rod of the hydraulic cylinder and a second end configured to pierce an exterior surface of a structure when the piston rod is extended toward the second end of the frame.

8. The working assembly of claim 7, wherein the flame is pivotally mounted to the end portion of the boom.

9. The working assembly of claim 8, wherein the midpoint of the frame is pivotally mounted to the end portion of the boom system.

10. The working assembly of claim 9, wherein the frame further comprises a rotary actuator secured at the midpoint of the frame.

11. The working assembly of claim 7, wherein the second end of the lance is configured to deliver a fluid.

12. The working assembly of claim 7, wherein the lance comprises a hollow body, the hollow body having a port for connection to a fluid source, the hollow body having at least one opening at the second end of the lance for delivery of fluid.

13. A working assembly for a fire fighting vehicle having a boom system, the working assembly comprising:

a frame mounted to an end portion of the boom system, the frame having a first end, a second end and a midpoint between the first and second ends; and means connected to the frame for piercing through an exterior surface of a structure, wherein the means for piercing through the exterior surface of a structure comprises:

a hydraulic cylinder having a piston rod, the hydraulic cylinder mounted to the frame near the first end of the frame, the piston rod being extendable toward the second end of the frame; and a lance configured for connection to a fluid source, the lance having a first end connected to the piston rod of the hydraulic cylinder and a second end configured to pierce an exterior surface of a structure when the piston rod is extended toward the second end of the frame.

14. The working assembly of claim 13, wherein the frame is pivotally mounted to the end portion of the boom system.

15. The working assembly of claim 14, wherein the midpoint of the frame is pivotally mounted to the end portion of the boom system.

16. The working assembly of claim 15, wherein the frame further comprises a rotary actuator secured at the midpoint of the frame.

17. The working assembly of claim 13, wherein the lance comprises a hollow body, the hollow body having a port for connection to a fluid source, the hollow body having at least one opening at the first end of the lance for delivery of fluid.

* * * * *